R. FLANIGAN.
MACHINE FOR APPLYING SOLDER TO RIMS OF CAPS FOR CANS.
APPLICATION FILED FEB. 26, 1909.
942,494.
Patented Dec. 7, 1909.
5 SHEETS—SHEET 3.
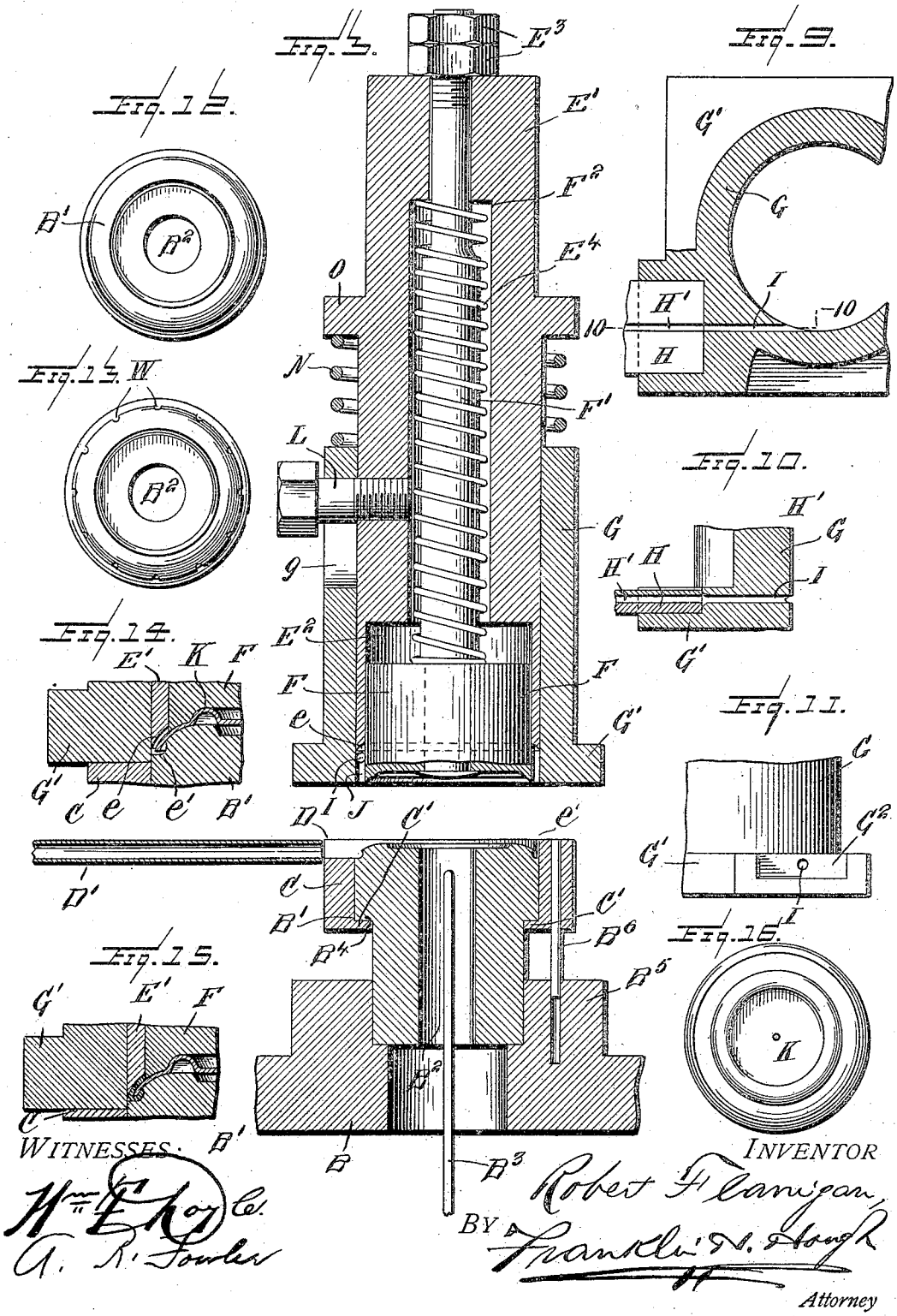

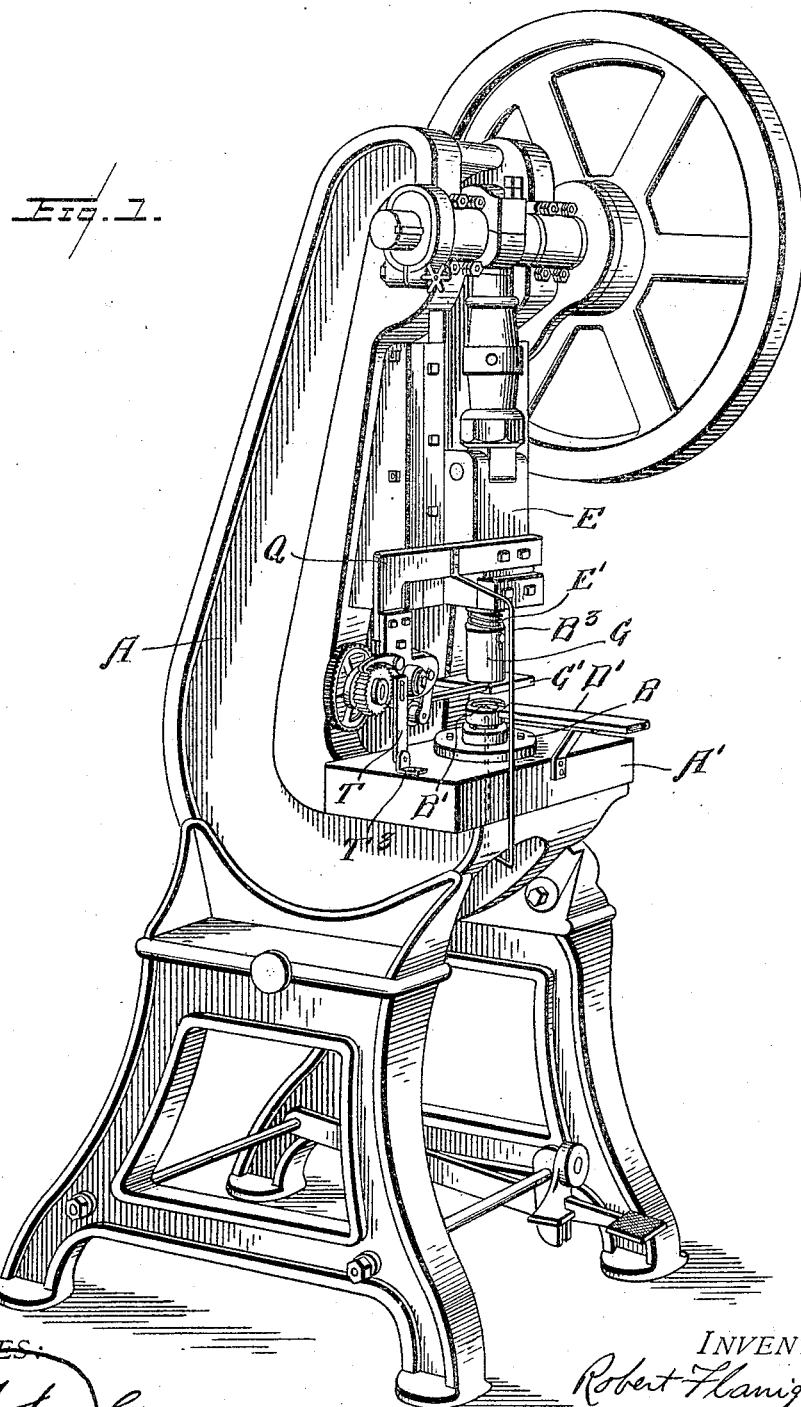

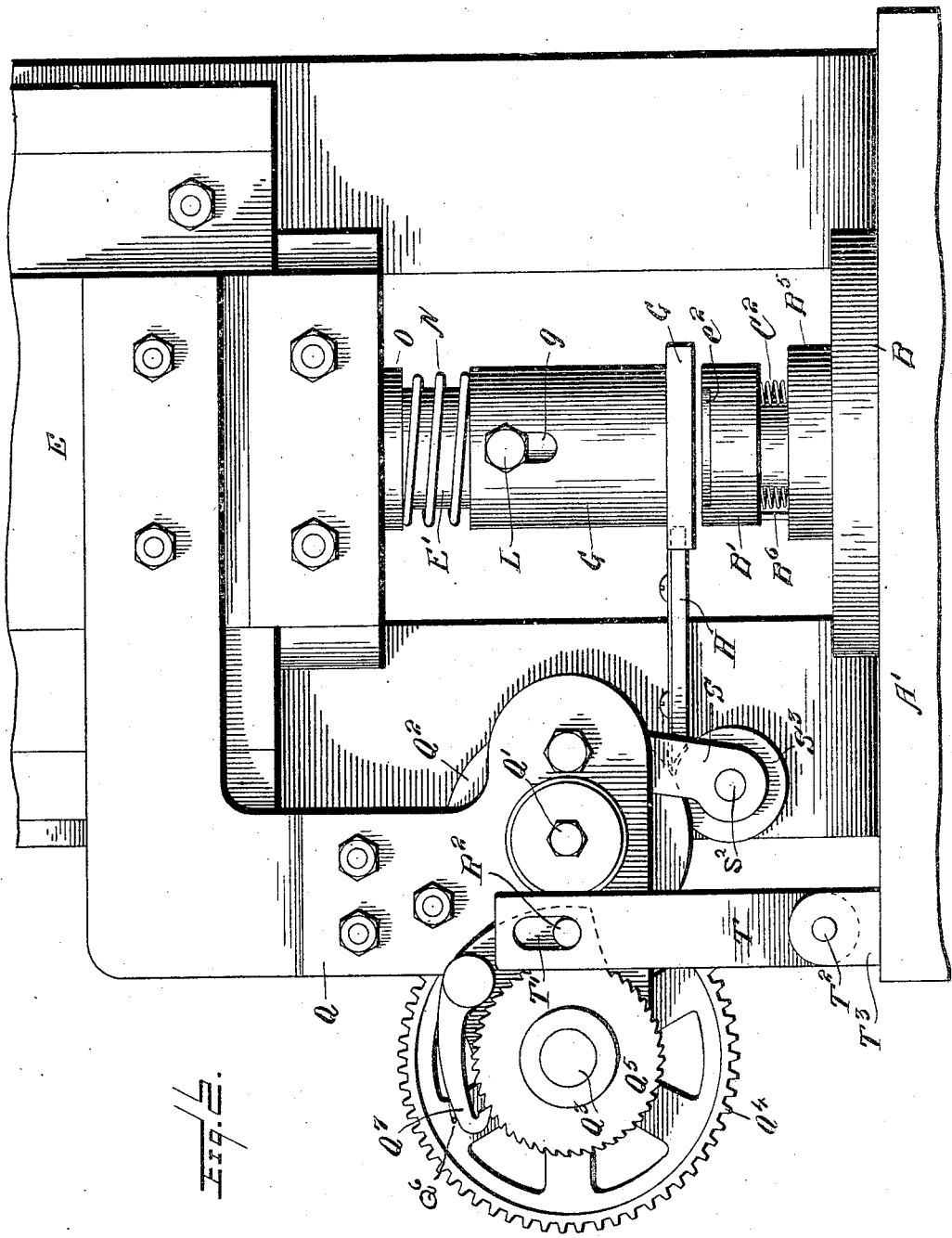

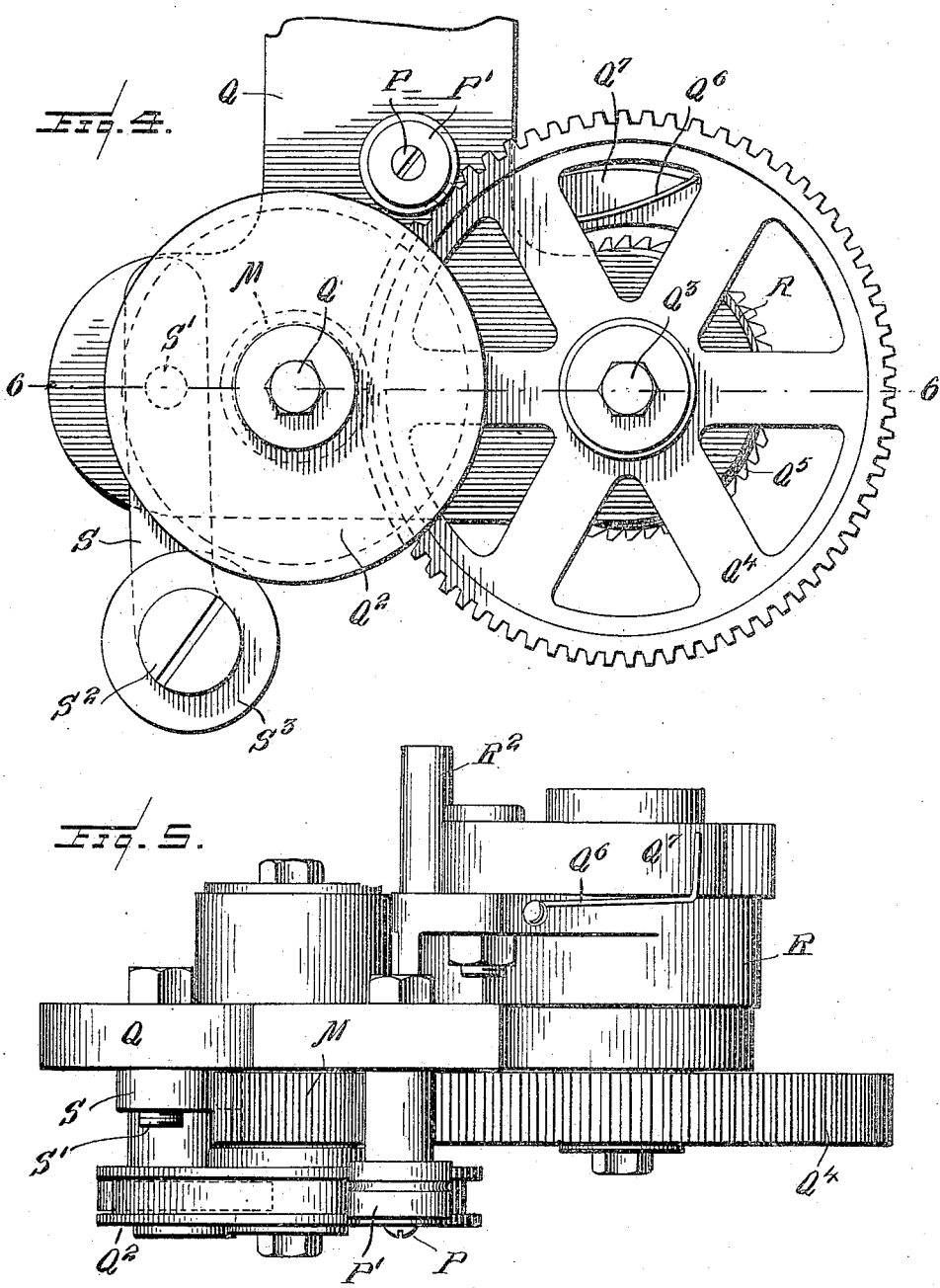

R. FLANIGAN.
MACHINE FOR APPLYING SOLDER TO RIMS OF CAPS FOR CANS.
APPLICATION FILED FEB. 26, 1909.
942,494.
Patented Dec. 7, 1909.
5 SHEETS—SHEET 5.
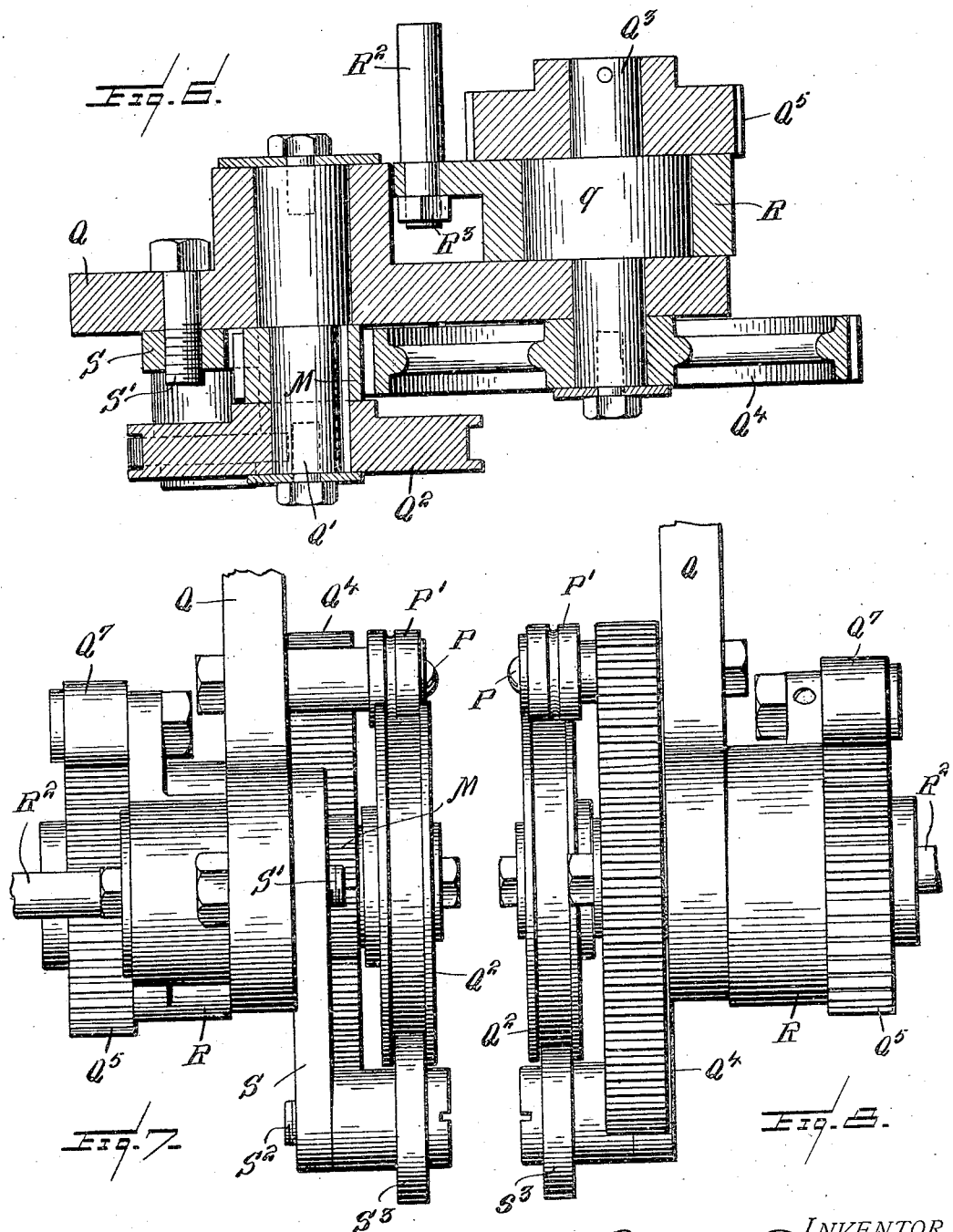

UNITED STATES PATENT OFFICE.

ROBERT FLANIGAN, OF BALTIMORE, MARYLAND, ASSIGNOR OF ONE-HALF TO EDWARD E. WEAVER, OF BALTIMORE COUNTY, MARYLAND.

MACHINE FOR APPLYING SOLDER TO RIMS OF CAPS FOR CANS.

942,494.

Specification of Letters Patent.   Patented Dec. 7, 1909.

Application filed February 26, 1909. Serial No. 480,273.

*To all whom it may concern:*

Be it known that I, ROBERT FLANIGAN, a citizen of the United States, residing at Baltimore city, in the State of Maryland, have invented certain new and useful Improvements in Machines for Applying Solder to Rims of Caps for Cans; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for applying solder to rims of caps for cans and comprises various details of construction, combinations and arrangements of parts which will be hereinafter fully described and then specifically defined in the appended claims.

My invention is illustrated in the accompanying drawings, in which:—

Figure 1 is a perspective view showing my apparatus as applied to a die press. Fig. 2 is an enlarged side view of the apparatus. Fig. 3 is a central longitudinal sectional view through the apparatus. Fig. 4 is a view in elevation of a part of the apparatus for feeding the wire solder. Fig. 5 is a top plan view of the mechanism shown in Fig. 4. Fig. 6 is a sectional view on line 6—6 of Fig. 4. Fig. 7 is a view in edge elevation from one side of the construction shown in Fig. 4. Fig. 8 is a view looking in the opposite direction from the opposite side. Fig. 9 is a sectional view through the frame holding the die and showing the duct through which the wire solder is fed. Fig. 10 is a sectional view on line 10—10 of Fig. 9. Fig. 11 is an elevation showing an end view of the projection upon the die casing through which the wire solder is fed. Fig. 12 is an end view of the die upon which the cap rests. Fig. 13 is a slight modification of the form of the die. Fig. 14 is a vertical sectional view of the dies brought together against the cap in the act of forcing the cold solder about the marginal edge of the cap. Fig. 15 is a detail sectional view through the dies showing the wire solder which has been forced about the edge of the cap, and Fig. 16 is a detail view of the cap with the solder applied to the marginal edge thereof.

Reference now being had to the details of the drawings by letter, A designates the frame of a die press having a table A′ upon which the die holding casing B forming a part of my invention is fastened in any suitable manner. Mounted within said casing B, a sectional view of which is shown in Fig. 3 of the drawings, is a die B′ having a hollow center B² through which an ejector rod B³ extends and provided for the purpose of ejecting a cap after a ring of solder has been formed about the marginal edge thereof. Said rod B³ is preferably fastened to the bracket arm Q which supports the apparatus upon the cross head of the die press. Said die has a shell or sleeve C mounted about the same and said shell or sleeve has an annular flange C′ about the opening in the bottom thereof, which flange extends underneath the shoulder B⁴ formed about the circumference of said die. Springs, designated by letter C², are interposed between the upwardly projecting portion B⁵ of the casing B and the under edge of said shell or sleeve C and serve to normally hold the same at its highest limit. A guide pin, designated by letter B⁶, is secured to the die casing B and passes through an aperture in the shell or sleeve C. The upper edge of said shell or sleeve C is recessed away at D to receive caps fed by gravity through the chute D′ to the upper surface of the die B′, it being understood that the chute and also the dies are disposed at an inclination when the apparatus is adjusted for use and the caps may be fed by any suitable means not shown into the chute.

Fastened to the cross head E of the press is a die E′, the lower end of which is chambered out as at E² for the reception of the die F which has a plunger F′ extending up through the hollow portion of the die E′ and has nuts E³ fitted to its threaded end. A coiled spring E⁴ is mounted upon said plunger F′ and bears between the die F and the shoulder F² formed at the upper end of the chambered portion of the die E′, the purpose of said spring being to normally hold the die F at its farthest downward limit. Said die E′ is mounted with a shell G, the lower end of which has a flange G′ which is recessed as at G² for the reception of the wire solder guided in the guideway H having an aperture H′ therethrough, as shown clearly in Fig. 10 of the drawings. At the end of the recess G² is an aperture I, shown clearly in Figs. 9, 10 and 11, through which the wire solder is fed into an annular recess J about the die F and in position to be forced down about the marginal edge of the cap in a manner which will be presently described.

It will be noted upon reference to Figs. 3 and 14 of the drawings that the lower edge of the die E′ is circular in form and tapers to a sharp edge $e$ and is normally positioned at the upper portion of said annular recess J before the dies are brought together. It will also be noticed upon reference to Figs. 3 and 14 that there is a slight space, designated by letter $e'$, which is about the marginal edge of the die B′, this being provided to allow the solder to be forced upward underneath the edge of the cap K and is shown in Fig. 14 in the position which it will assume when the solder is being applied to the marginal edge thereof.

Fixed to and projecting from the die E′ is a screw L which passes through an elongated slot $g$ formed in the shell G. A coiled spring N is mounted upon the die E′ and bears between an integral collar O upon said die E′ and the top of the shell G and serves to normally hold the die E′ at its upper limit.

Referring to Figs. 2, 4 and 5 will be seen a means for feeding forward the wire solder in predetermined lengths sufficient to form a complete ring about the cap. Mounted in the bracket arm Q of the frame is a shaft Q′ upon which is mounted a groove wheel Q², the diameter of which is of such a size as will, by a partial revolution, feed forward a sufficient length of the wire solder to surround the marginal edge of a cap of a certain size, it being understood that, where solder is to be applied to caps of different sizes, wheels of different diameters may be utilized, each feeding forward a certain length of solder according to the size of the cap to which it is to be applied.

S designates a link which is pivotally mounted upon a pin S′ fixed to the frame A and carries a stub shaft S² upon which is journaled a wheel S³, the marginal edge of which turns within the groove in the wheel Q² and, by this means, it will be noted that the link S may be swung upon its pivot in order to vary the distance between the wheel S³ and the guide wheel P′ when it is desired to utilize solder feeding wheels of different diameters to apply the requisite amount of solder to the marginal edges of caps of different sizes. Also mounted in said frame is a shaft Q³ to which a gear wheel Q⁴ is keyed and Q⁵ designates a ratchet wheel also mounted upon and rotating with the shaft Q³. A spring, designated by letter Q⁶, bears against and is adapted to hold the free end of the pivotal pawl Q⁷ in engagement with the ratchet wheel Q⁵. The pawl Q⁷ is mounted upon a sleeve R which turns about an integral collar $g$ which is integral with or fixed to the frame Q, and R² designates a pin which is fastened by means of a nut R³ to a projection of the sleeve R and is adapted to have a play in an elongated slot T′ formed in the bar T which is fastened by means of a pin T² upon a bracket member T³, shown clearly in Figs. 1 and 2 of the drawings. The gear wheel Q⁴ meshes with a gear wheel M keyed to the shaft Q′ to which the wheel Q² is also keyed, thereby causing the latter to revolve as motion is imparted to the gear wheel Q⁴. Journaled upon the stub shaft P, fastened to the frame A, is a grooved pulley P′ which serves as a guide to hold the wire solder against the grooved circumference of the wheel Q².

S′ designates a screw upon which a link is mounted, and held in an adjustable position by the tightening of said screw. A grooved wheel S³ is journaled on a screw S² and coöperates with the wheel Q² to guide the wire solder.

In Fig. 13 of the drawings, I have shown a slight modification of the die against which the cap is held while receiving the solder and in said modification I have shown a series of grooves or notches, designated by letter W, through which the solder may be forced by the impact of the upper die, thus causing a series of thickened or reinforced portions spaced apart about the marginal edge of the cap. If preferred, the marginal edge of the modified form may extend downward sufficiently so that the only solder which extends underneath the cap when it is applied thereto will be at the notches or grooves.

In operation, the frame of the press to which the apparatus is attached is preferably positioned at an inclination so that the caps to the marginal edges of which the solder is to be applied may fall by gravity upon the die B′. A cap falling by gravity to a position resting on the die B′ is in readiness to receive the solder upon its edge. The wire of solder, which is preferably wound once or twice about the wheel Q² to prevent slipping and being held from buckling or getting out of the groove of said wheel by the two wheels P′ and S³ shown in Fig. 4 of the drawings, is fed forward as the wheel Q² is rotated, thereby causing the solder wire to be fed through the registering apertures H′ and I and pushed forward to form a ring in the annular space about the lower end of the die F and beneath the lower inclined edge of the die E′. The wire solder thus being fed in the manner shown, the two dies F and E′ move downward, the former having a yielding movement while the latter has a positive movement. As the die F comes in contact with the cap, it holds the latter against the die B′ in the manner shown in Fig. 14 of the drawings. As the die F comes in a position to coöperate with a die B′ to hold the cap securely, said die F comes to a stop while the surrounding die E′ continues its forward downward movement and, as the inclined end e of the die E′ comes in contact with the wire, the sharp edge of said die E′ will sever the wire solder, thus leaving a ring of the latter. Upon a further downward movement of the die E′, the ring of wire solder will be forced down about the marginal edge of the cap and in the space e′ underneath the same, thus forcing the solder about the marginal edge of the cap in the manner shown in Fig. 15 of the drawings. The dies having performed the functions described and the cold solder being formed about the edges of the caps, the ends of the wire solder will be pressed together by the forcible impact of the dies against the solder, thus securely holding the solder to the marginal edge of the cap. As the dies separate on the upper throw of the draw head to which the apparatus is attached, the ejector rod B³ moving upward with the bracket arm Q will come in contact with the under face of the cap to cause the same to be released from the die upon which it rests while receiving the solder and the finished cap will fall by gravity from the die and another cap to which solder is to be applied will fall upon the die B′. As the dies E′ and F descend and as the lower end of the shell G comes in contact with the shell or sleeve C, the latter will yield under the expansion of the springs C² and also the ends of the chute D′ which leads into the recess D in said sleeve C and, after the dies separate, the shell or sleeve C and the chute will return to their normal positions.

It will be noted that, when the dies E′ and F withdraw from the die B′, the spring E⁴ will cause the die F to assume the position shown in Fig. 3 of the drawings while the shell G will be thrown to its normal position by means of the spring N, thus forming the space J about the circumference of the die F for the reception of a new ring of wire solder to be fed therein. As the dies E′ and F are approaching their upper limits and as the pin R² contacts with the upper end of the recess T′, shown clearly in Fig. 2 of the drawings, the pawl Q⁷ which engages one of the teeth of the ratchet wheel Q⁵ will cause a partial revolution to be imparted to the latter which, through the medium of the shaft Q³, the gear wheel Q⁴ and the gear connections with the wheel Q² about which the wire solder winds, will cause a new supply of solder wire to be fed into the chamber or space about the die F in readiness to be applied to another cap. When the pin R² strikes the lower end of the slot T′ on the downward movement of the dies, the pawl Q⁷ will turn idly upon the ratchet wheel Q⁵. This feeding forward of the wire solder, it will be observed, does not take place until the two dies F and E′ reach their upper limits which positions are shown in Fig. 3 of the drawings. It will be noted that the screw L serves to limit the throw of the shell G. After the two dies E′ and F reach their normal positions, the pin R² will have come into contact with the upper end of the slot T′ and cause the feeding forward of the solder into the annular space J. The solder having been fed forward in the manner set forth, a downward movement of the dies will repeat the operation described, thus forcing the ring of solder about the marginal edge of the cap and causing the solder to adhere to the cap in the manner shown in Figs. 15 and 16 of the drawings.

It will be understood that where solder is to be applied to the marginal edges of the caps of various sizes wheels of different diameters about which the solder wire winds may be utilized, the wheel being formed of a predetermined diameter for this purpose. As the wheel S³ is mounted upon the link S and the latter is allowed to swing upon its pivot, provision is made for allowing solder wheels of different diameters to be utilized accordingly as it may be desired to feed solder to different size caps, the swinging of the link varying the distance between the two wheels P′ and S³. It will be noted that the wire is not cut until the upper and lower dies come into contact so there is no possibility of the solder dropping out or being misplaced. In order to allow the duct H′ to adapt itself to the slight difference in movement between the outer shell and the die and to insure the registration of the duct H′ therein with the opening for the passage of the wire solder, said duct is provided with suitable yielding connection.

It will of course be understood that, while I show a single bottom die, it is not my purpose to limit myself to the use of a single die and that a series of dies may be employed if desired.

What I claim to be new is:—

1. An apparatus for applying solder to caps, comprising a stationary die upon which the cap rests, a movable yielding die adapted to hold the cap upon said stationary die, means for feeding a wire solder to a position adjacent to the dies, a positively driven die having a chambered portion within which the yielding die telescopes, a shell in which said positively driven die is mounted, a projection upon the latter extending through an elongated slot in said shell, a spring interposed between the projection of the positively driven die and said shell, causing the latter to return to its normal position to form a space for the reception of the wire solder, said positively driven die having a circular tapering end adapted to sever a wire solder which has been previously fed beneath the same and afterward force the ring of solder about the marginal edge of a cap held between the yielding and the stationary dies, as set forth.

2. An apparatus for applying solder to caps, comprising a stationary die upon which the cap rests, a movable yielding die adapted to hold the cap upon said stationary die, means for feeding a wire solder to a position adjacent to the dies, a positively driven die having a chambered portion in which said yielding die is mounted, a shell in which the positively driven die is mounted, a guideway leading to and connected with said shell in which a wire solder is fed into the space intermediate the shell and said movable yielding die, the end of said positively driven die adapted to sever the wire solder and force the latter about the edge of a cap held between the stationary and yielding dies, as set forth.

3. An apparatus for applying solder to caps, comprising a stationary die upon which the cap rests, a movable yielding die adapted to hold the cap upon said stationary die, means for feeding a wire solder to a position adjacent to the dies, a positively driven die having a chambered portion in which said yielding die is mounted, a shell in which the positively driven die is mounted, a guideway leading to and connected with said shell in which a wire solder is fed into the space intermediate the shell and said movable yielding die, the end of said positively driven die adapted to sever the wire solder and force the latter about the edge of a cap held between the stationary and yielding dies, and means for ejecting a cap to which said solder has been applied, as set forth.

4. An apparatus for applying solder to caps, comprising a stationary die upon which the cap rests, a movable yielding die adapted to hold the cap upon said stationary die, means for feeding a wire solder to a position adjacent to the dies, a positively driven die having a chambered portion in which said yielding die is mounted, a shell in which the positively driven die is mounted, a guideway leading to and connected with said shell in which a wire solder is fed into the space intermediate the shell and said movable yielding die, the end of said positively driven die adapted to sever the wire solder and force the latter about the edge of a cap held between the stationary and yielding dies, an ejector rod mounted within the stationary die and movable with the positively driven die, as set forth.

5. An apparatus for applying solder to caps, comprising a stationary die upon which the cap rests, a yielding shell mounted about said die, a cap feeding chute leading to said die, a positively driven die having a chambered portion in its end, a yielding die mounted within said chamber, a yielding shell mounted about said positively driven die, and means for feeding wire solder in the space between the yielding die and said shell, as set forth.

6. An apparatus for applying solder to caps, comprising a stationary die upon which the cap rests, a yielding shell mounted about said die, the upper edge of said shell being recessed, a chute leading to said recess, a positively driven die having a chamber in its lower end, a yielding die mounted in said chamber, a shell in which said positively driven die is mounted and through which wire solder is adapted to be fed into the space intermediate the wall of said chamber and the circumference of the yielding die, a wheel about which the wire solder passes, and means for imparting a rotary movement to said wheel, whereby the solder wire may be fed forward, as set forth.

7. An apparatus for applying solder to the marginal edge of a cap consisting of a stationary die upon which the cap rests, a positively driven die having a chamber in the end thereof, a yielding die mounted in said chamber, a shell in which said positively driven die is mounted, said shell having an aperture in the wall thereof, a grooved wheel about which wire solder passes, a ratchet wheel, a pawl adapted to engage the teeth of said ratchet wheel, gear connections between said ratchet and grooved wheels, a cross head to which said wheels and the positively driven and yielding dies are connected, and stationary means adapted to cause said solder to be fed forward as the cross head reciprocates, as set forth.

8. An apparatus for applying solder to the marginal edge of a cap consisting of a stationary die upon which the cap rests, a positively driven die having a chamber in the end thereof, a yielding die mounted in said chamber, a shell in which said positively driven die is mounted, said shell having an aperture in the wall thereof, a grooved wheel about which wire solder passes, a ratchet wheel, a pawl adapted to engage the teeth of said ratchet wheel, gear connections between said ratchet and grooved wheels, a cross head to which said wheels and the positively driven and yielding dies are connected, a stationary bar having a slot therein, a loosely mounted sleeve upon which said pawl is mounted, a pin projecting from said sleeve through said slot in the stationary bar and adapted, as the cross head reciprocates, to contact with the opposite ends of the slot to actuate said pawl, as set forth.

9. An apparatus for applying solder to the marginal edge of a cap consisting of a stationary die upon which the cap rests, a movable cross head, a positively driven die secured to said cross head and having a chamber in the lower end thereof, a yielding die mounted within said chamber, a shell die about said positively driven die, a bracket arm secured to said cross head, a rotatable grooved wheel mounted upon said bracket arm and about which the wire of solder is adapted to pass, means for imparting a movement to said wheel whereby a wire of solder may be fed within the chamber between the positively driven die and said shell and about the circumference of the yielding die as the dies separate, as set forth.

10. An apparatus for applying solder to the rim of caps, comprising a stationary die upon which the cap rests, a movable cross head, a positively driven die connected thereto and provided with a chamber, a yielding die mounted within said chamber, a yielding shell in which said positively driven die is mounted, a bracket arm fixed to said cross head, shafts mounted upon said bracket arm, a grooved wheel mounted upon one of said shafts and about which a wire of solder is adapted to pass, a gear and a ratchet wheel mounted upon the other of said shafts, a sleeve journaled upon the shaft carrying said ratchet wheel, a pawl pivotally mounted upon said sleeve and adapted to engage said ratchet teeth, a pin projecting from said sleeve, a stationary bar having a slot therein through which said pin projects, as set forth.

11. An apparatus for applying solder to the rim of caps, comprising a stationary die upon which the cap rests, a movable cross head, a positively driven die connected thereto and provided with a chamber, a yielding die mounted within said chamber, a yielding shell in which said positively driven die is mounted, a bracket arm fixed to said cross head, shafts mounted upon said bracket arm, a grooved wheel mounted upon one of said shafts and about which a wire of solder is adapted to pass, a gear and a ratchet wheel mounted upon the other of said shafts, a sleeve journaled upon a bearing carrying said ratchet wheel, a pawl pivotally mounted upon said sleeve and adapted to engage said ratchet wheel, a pin projecting from said sleeve, a stationary bar having a slot therein through which said pin projects, a guide wheel mounted upon said bracket arm and adapted to prevent the wire about said grooved wheel from buckling, as set forth.

12. An apparatus for applying solder to the rim of caps, consisting of a stationary die upon which the cap rests, a movable cross head, a stationary die fixed thereto and having a chamber in its lower end, a yielding die mounted in said chamber, a stem to said yielding die, a spring bearing between the movable die and the end of the chambered portion of the positively driven die, a slotted shell within which the positively driven die is mounted, a pin projecting from the latter and extending through a slot of said shell, and means for feeding wire solder into said chamber about the circumference of the yielding die and below said positively driven die, as said dies separate from each other, as set forth.

13. An apparatus for applying solder to the rim of caps, consisting of a stationary die upon which the cap rests, a movable cross head, a stationary die fixed thereto and having a chamber in its lower end, a yielding die mounted in said chamber, a stem to said yielding die, a spring bearing between the movable die and the end of the chambered portion of the positively driven die, a slotted shell within which the positively driven die is mounted, a coiled spring bearing between the upper end of said shell and an integral collar of said positively driven die, and means for feeding a wire solder into said chamber about the yielding die and beneath the positively driven die as the latter separates from the stationary die, as set forth.

14. An apparatus for applying solder to the rim of caps consisting of a stationary die having a groove adjacent to the outer marginal edge thereof and over which a cap resting upon said die extends, a positively driven die having a chamber therein, a yielding die mounted in said chamber, a yielding shell in which said positively driven die is mounted, and means for feeding wire solder into the chamber about the circumference of the yielding die and beneath the positively driven die as the latter separates from the stationary die, as set forth.

15. An apparatus for applying solder to the rims of caps, comprising a stationary die, a mounting therefor, a flanged shell mounted about said die, a pin projecting from said shell and engaging a slot in said mounting, springs bearing between the mounting and said shell, a positively driven die having a chamber in the lower end thereof, a yielding die mounted in said chamber, a shell about the positively driven die, and means for feeding wire solder into said chamber about the circumference of the movable die and beneath said positively driven die, as set forth.

16. An apparatus for applying solder to caps, comprising a stationary die upon which the cap rests, a movable yielding die adapted to hold the cap upon the stationary die, and solder feeding means movable in unison with the die, as set forth.

17. An apparatus for applying solder to caps, comprising a stationary die upon which the cap rests, a movable yielding die designed to hold the cap upon a stationary die, interchangeable wheels of predetermined sizes for feeding a certain amount of solder to be applied about the marginal edges of different diameters of caps, as set forth.

18. An apparatus for applying solder to caps, comprising a stationary die upon which the cap rests, a movable yielding die designed to hold the cap upon said stationary die, solder feeding means for feeding wire solder to a position adjacent to the dies and above the caps, a positively driven die adapted to force a ring of solder around and underneath the marginal edge of a cap held between the movable and stationary dies, as set forth.

19. In a cap hemming machine, and in combination with the coöperating parts, a movable die carrier, a wire solder feeding mechanism fixed to and movable in unison with said die, as set forth.

20. An apparatus for applying solder to caps, comprising a stationary die upon which the cap rests, a yielding movable die designed to hold the cap upon said stationary die, interchangeable wheels of predetermined sizes for feeding a certain amount of solder to be applied upon caps of different diameters, said interchangeable wheels moving in unison with the die, as set forth.

In testimony whereof I hereunto affix my signature in the presence of two witnesses.

ROBERT FLANIGAN.

Witnesses:
A. L. HOUGH,
A. K. FOWLER.